Dec. 2, 1924. 1,518,062
W. E. GLANCY
RUBBER SHOE AND METHOD OF MAKING SAME
Filed April 21, 1924
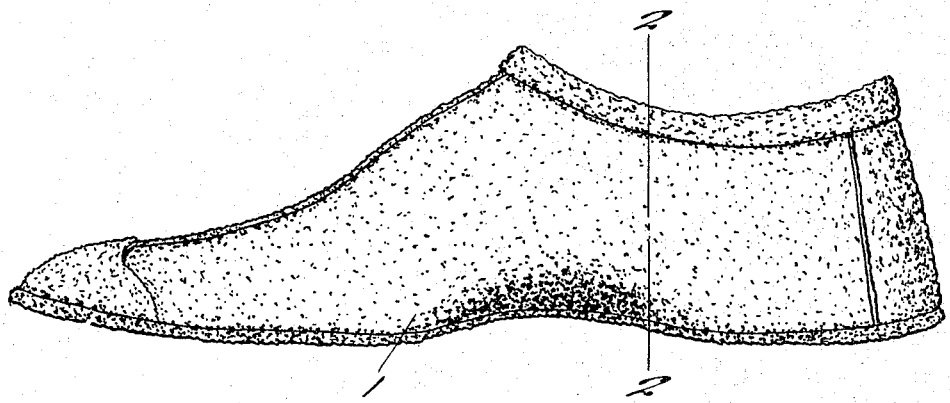
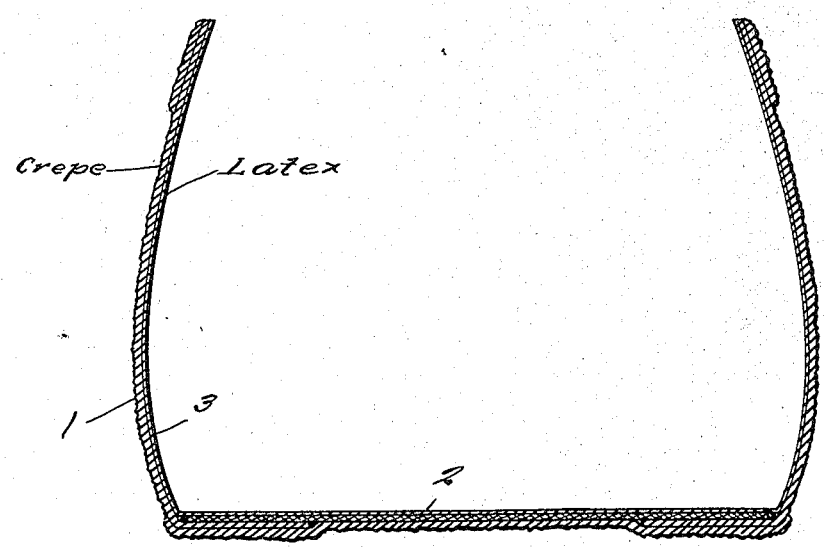
Inventor
Warren E. Glancy
By
Attorney Patented Dec. 2, 1924.

1,518,062

UNITED STATES PATENT OFFICE.

WARREN E. GLANCY, OF WALTHAM, MASSACHUSETTS, ASSIGNOR TO HOOD RUBBER COMPANY, OF WATERTOWN, MASSACHUSETTS, A CORPORATION OF MASSACHUSETTS.

RUBBER SHOE AND METHOD OF MAKING SAME.

Application filed April 21, 1924. Serial No. 708,052.

*To all whom it may concern:*

Be it known that I, WARREN E. GLANCY, a citizen of the United States, and a resident of Waltham, in the county of Middlesex and State of Massachusetts, have invented certain new and useful Improvements in Rubber Shoes and Methods of Making Same, of which the following is a specification.

My present invention relates to improvements in rubber bathing shoes and to the method of making the same.

The invention aims to provide a shoe of this character which will be light, strong, durable and of attractive appearance, comfortable to the wearer and which may be produced at a low cost, and the invention includes the novel article and method of making the same hereinafter described and defined by the appended claims.

In proceeding according to my invention, I provide a last or form of suitable size and shape and of proper material, conveniently of aluminum, such as are customarily used in the manufacture of rubber footwear, and give it a coating of latex. This may be conveniently accomplished by repeatedly dipping the last in latex and allowing it to dry between dippings, the drying being facilitated by a current of warm dry air. I have found that dipping approximately ten times with drying intervals of five minutes will produce a skin coating of sufficient thickness, the latex used being the usual commercial article containing approximately 32% rubber. Thereafter I apply to the last sole and upper forming parts which are cut from sheets of crêpe rubber. This may be pure crêpe rubber or may be crêped compounded rubber produced by compounding rubber with the usual ingredients and passing it between calender rolls maintained in a cold condition.

The shoe parts may be assembled in the manner customary in building rubber shoes, as for example an insole formed preferably of light square woven burlap coated with rubber compound on both sides is rolled onto the bottom of the latex coated last, whereafter the upper is applied in the usual way, and the toe piece or cap, outsole, and bind; and if desired a heel piece and decorative figures may be applied.

The construction of the shoe described above may be altered somewhat without changing the essential features of the invention. For instance, it has been found possible to make a very serviceable shoe without the latex covering on the last and at a slightly lower cost, the outward appearance being similar to that of the shoe described above.

Vulcanization is carried out either in the so-called steam cure, hot air or by cold cure, according to the preparation of the crêpe. If vulcanizing materials have been incorporated into the rubber, it is customary to use the steam or hot air methods. If uncompounded rubber is used it is customary to vulcanize the shoe in cold cure by the use of sulphur-chloride or other suitable means.

After vulcanization the shoe is stripped from the last, the latex coating leaving the last and remaining in permanent adherence to the inner surface of the shoe, being permanently united thereto by the process of vulcanization.

I have found by the use of a latex coating for the last as above described that the process of building the shoe is greatly facilitated, as the crêpe sheet will adhere to the latex coating without the necessity of a cloth bind or the use of cement, while the completed article can be readily stripped from the last. Further, the resulting shoe is exceedingly comfortable, as the latex lining has a smooth feel to the foot, whereas the crêpe rubber is uncomfortable in contact with the skin, due to its roughness.

It is often desirable to furnish shoes of this description in various colors. When transparent colors are desired, colored pigments are unsuitable. The shoes vulcanized in cold cure, as described above, have been colored by means of organic dyestuffs through a dyeing process. This process may be carried out either before the parts are built into the shoe, after the shoe is built but before vulcanization, after the first vulcanization, or after vulcanization is completed. The process consists in dipping the rubber or rubber article into a suitable dyeing bath and immediate removal from the same. The dyeing bath consists of a commercial dye dissolved in an organic solvent such as naphtha, benzol or carbon tetrachloride. Many dyes may be used for this purpose: For example, 0.1% oil yellow, a mono azo dye, dissolved in naphtha makes an exceedingly satisfactory bath. Upon removal of the material immersed from the bath, the color develops immediately and it is not leached out by water, either salt or fresh.

A shoe such as described in the above specification is shown in the accompanying drawings, in which:—

Figure 1 is a side elevation and
Fig. 2 a transverse section.

In this drawing 1 represents the body of the shoe made of crêpe rubber, 2 the insole, and 3 the latex lining.

Having thus described my invention, what I claim is:

1. A rubber shoe having a lining of latex rubber.

2. A rubber shoe formed of crêpe rubber having a latex rubber lining.

3. The described process of making rubber footwear which consists in providing a last with a coating of latex, applying shoe forming parts of rubber thereto, vulcanizing the article to unite the shoe parts to each other and to the latex coating, and stripping the united parts from the last.

4. The described process of making rubber footwear which consists in providing a last with a coating of latex, applying shoe forming parts of crêpe rubber thereto, vulcanizing the article to unite the shoe parts to each other and to the latex coating, and stripping the united parts from the last.

5. The described process of making rubber footwear which consists in providing a last with a coating of latex, applying shoe forming parts of rubber thereto, vulcanizing the article to unite the shoe parts to each other and to the latex coating, dipping the article in a dyeing bath comprising dye material dissolved in an organic solvent, and stripping the united parts from the last.

In testimony whereof, I affix my signature.

WARREN E. GLANCY.